VIDEO AMPLIFIER COUPLING NETWORK FOR TELEVISION RECEIVERS

Filed May 4, 1950 2 SHEETS—SHEET 1

INVENTOR.
FRANCIS A. WISSEL
BY
Alden D. Redfield
ATTORNEY.

INVENTOR.
FRANCIS A. WISSEL
BY
Alden D. Redfield
ATTORNEY.

Patented Dec. 11, 1951 2,577,868

UNITED STATES PATENT OFFICE 2,577,868

VIDEO AMPLIFIER COUPLING NETWORK FOR TELEVISION RECEIVERS

Francis A. Wissel, Cincinnati, Ohio, assignor to Avco Manufacturing Corporation, Cincinnati, Ohio, a corporation of Delaware Application May 4, 1950, Serial No. 160,028

2 Claims. (Cl. 178—7.5)

The present invention, which is briefly disclosed in application Serial No. 141,984, filed in the United States Patent Office on February 2, 1950, by Francis A. Wissel et al., and assigned to the same assignee as the instant application, relates to an improved circuit for coupling a signal utilization device to an amplifier output circuit. More specifically, the present invention relates to an improved coupling circuit, for coupling a synchronizing separator circuit of a television receiver to a video amplifier stage without interfering with optimum video amplifier high frequency compensation.

The last stage of video amplification is an attractive source of synchronizing signals, because at this point the composite television signal reaches its highest amplification. This means that the synchronizing signals, being part of the composite television signal, also reach their highest amplification in the output circuit of the last stage of video amplification. Since most synchronzing separator circuits function best when a high amplitude signal is fed to their input, it can be seen that this is an advantageous place to extract the synchronizing signals for separation purposes.

However, the sync separator input circuit does introduce additional impedance elements in the output of the video amplifier, and its action on the flat frequency response characteristic of the video amplifier must be considered. The input capacitance of the next stage, which may be assumed to be connected to the stage of video amplification under consideration here, highly attenuates the high frequency portion of the video signal band and compensating precautions are necessary to maintain a flat response characteristic over the signal frequency band. This arises from the fact that the input capacitance of the next stage following the video amplifier is effectively in shunt with the plate load resistance of the video amplifier, and therefore a part of the video amplifier plate load circuit. Since the reactance of the shunt capacitor, that is, the reactance of the input capacitance of the next stage, decreases for increasing signal frequencies, it can be seen that the amplification of an uncompensated video amplifier also decreases for impressed high frequency video signals.

There are several conventional compensating circuits which have been developed for eliminating this inherent debility of video amplifier circuits, including the main compensating systems now used in practice which are known as series peaking networks, shunt peaking networks and combination peaking networks. All of these systems include an inductance coil combined with the input capacitance of the next stage to form a resonant network wherein the impedance presented by the peaking coil or inductance increases as the impedance of the input capacitance decreases. Because of this plate load impedance change, the low frequency portion of the video signal "sees" an amplifier load impedance which in the main comprises resistance, while the high frequency portion of the video signal "sees" an amplifier plate load impedance in which inductive reactance tends to cancel the shorting effect of the input capacitance of the next stage and other stray capacitances. By careful choice of circuit elements it is possible to tailor the parameters of such a network so that a relatively flat frequency response can be realized, thereby allowing picture information to be transferred from one stage of amplification to the next stage without distortion in either the high frequency portion of the signal band or the low frequency portion of the signal band. The addition of a second input capacitance, e. g., the input capacitance of a sync separator circuit complicates this compensation problem.

The prior art teaches a method of coupling the sync signal separator circuit to a high frequency compensating network by directly coupling the input circuit of the sync signal separator across a resistive element in the high frequency compensating network. This added input capacitance obviously changes the response characteristics of the compensating network. For this reason, it has been the practice in the past to couple the sync separator input directly across an amplifier plate load resistance and then tailor the high frequency compensation network so as to also compensate, as much as is possible, for the input capacitance of the synchronizing separator input circuit. This method of coupling, though seemingly simple, interferes with the frequency characteristic of the video amplifier and is at best a compromise between optimum signal transfer and optimum sync signal separation takeoff.

The primary object of the present invention is to provide improved means for coupling a signal utilization device to a high frequency compensated amplifier.

It is also an object of the present invention to provide a means for coupling a first electronic tube device to the output of an amplifier, whereby the inherent input capacitance of the first electronic tube device does not distort the amplifier signal output fed to a second electronic device, and whereby high amplification can be realized in the output of the amplifier.

It is a further object of the present invention to couple a signal separator circuit to the last video amplifier stage, without interfering with the high frequency compensation of the video amplifier, and at the same time to attenuate the higher frequency information fed to the signal separator circuit.

Applicant's problem, therefore, was to couple a synchronizing separation device into the video amplifier output circuit without interfering or compromising the optimum compensating effect which could be realized with a series peaking, shunt peaking or combination compensating system. As explained above, it can be seen that the addition of a new circuit element which has inherent input capacitance normally would interfere with the carefully tuned compensating network unless some means could be devised so as to make the video amplifier output completely "unaware" of the added circuit's input capacitance.

It will be understood as the description proceeds that the invention is not confined to the particular amplifying system herein shown, but the information is of general utility in any amplifying system, frequency compensated or uncompensated, wherein a resistance is one of the plate load elements, or in any system wherein it is desired to take off a signal from a coupling network, which includes a resistive element, between a signal generator and a utilization device, and feed the signal taken off to a second utilization device having inherent input capacitance that would otherwise modify the desired coupling network characteristics.

It will also be understood that conventional input capacitance stabilization circuits are to be used, but not herein shown or described where the "Miller" effect interferes with satisfactory circuit operation.

In order to describe my invention I have chosen in one illustration to show a shunt peaking type of compensation network, which generally comprises a resistance and an inductance connected in series between the AC by-passed plate supply and the anode of a video amplifier. The resistance element of the shunt peaking system, in my novel circuit, comprises a constant resistance network, including resistance and inductive elements, which are so connected and their parameters so selected, as to coact with the input capacitance of the signal separator circuit, and form a constant resistance network which is independent of signal frequency variations. By this, I mean that the complete constant resistance network, though including inductive reactance elements and capacitive reactance elements, appears to be, so far as the video amplifier output is concerned, the equivalent of a single constant resistance element. Therefore, since all compensating networks include a resistance element, I have devised a means whereby a few simple circuit elements can be added along with the signal separator input circuit without compromising the optimum results realized from any high frequency compensating system which might be employed.

For a better understanding of the present invention, together with other and further objects, advantages and capabilities thereof, reference is made to the following disclosure and appended claims, in connection with the accompanying drawing, in which:

Figure 1:
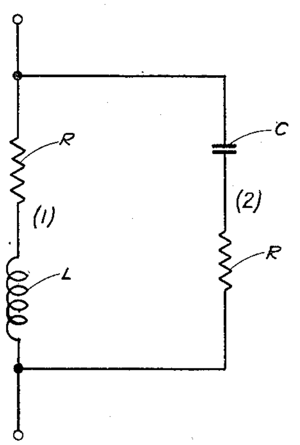
Fig. 1 is a circuit diagram showing a constant resistance network.

Fig. 1 illustrates a two-branch constant resistance network, the first branch of which comprises a resistance R and an inductance L, while the second branch which is connected in parallel with the first branch, comprises a resistance R and a capacitance C. The pair of resistances R, R are of equal value and the values of inductance L and capacitance C are directly related to the parameter selected for the resistances R. It may be shown that in such a network the input impedance presented to an input voltage $E_{in}$, at all frequencies, is a constant resistance equal to the value of R so long as the values of L and C are properly related.

Referring to the circuit of Fig. 1, it can be seen that the impedance offered by the network to a signal of infinitely high frequency would be equal to the resistance R of the second branch along, because $X_1$ of branch (1) would be infinite and $X_c$ of branch (2) would be zero.

Also, it can be seen that the impedance offered by the network to a signal at zero frequency would be equal to the R of the first branch alone, because $X_c$ of branch (2) would be infinite and the $X_1$ of the first branch would be zero.

Therefore, it follows that the resistance value for R in branch (1) must equal the resistance value of R in branch (2) if a constant resistance frequency independent network is desired. The impedance of branch (1) of the network is equal to $$R+(jX_1)$$

while the impedance of branch 2 is equal to $$R+(jX_c)$$

The equivalent impedance ($Z_e$) of the network is equal to $$\frac{(R+jX_1)(R-jX_c)}{(R+jX_1)+(R-jX_c)}$$

Therefore, since it is desired to make $Z_e=R$ and since $$Ze=\frac{R^2+X_1X_c-(jRX_c)+(jRX_1)}{2R-(jRX_c)+(jRX_1)}$$

it follows that $$R^2=X_1X_c$$

and (1) $$R=(X_1X_c)^{1/2}$$

Figure 2:
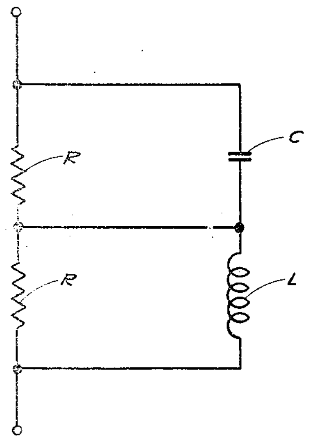
Fig. 2 is another constant resistance network which has properties similar to the network of Fig. 1.

Fig. 2 shows an equivalent network which exhibits the same properties as the network of Fig. 1, wherein the parameters are related in accordance with Equation 1 and the resistances R, R are also equal.

Figure 3:
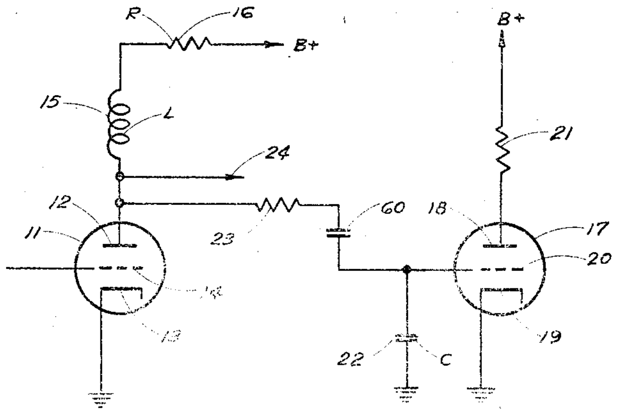
Fig. 3 shows an uncompensated amplifier stage embodying the present invention.

Fig. 3 illustrates how the constant resistance network of Fig. 1 can be used to couple an electronic tube device to a resistance loaded amplifier circuit without impairing the linearity of the amplifier output signal. The amplifier circuit comprises an electron tube 11 which has an anode 12, a cathode 13 and a grid 14. The anode 12 is connected to a plate supply source B+ through inductance 15 and resistance 16. Tube 17 of the signal utilization device comprises an anode 18, a cathode 19 and a grid 20. The anode 18 is connected to a source of potential B+ through resistance 21. Capacitance 22 which is connected between grid 20 and ground can be either the inherent input capacitance of tube 17 alone including lead capacitances, an actual capacitor connected between grid 20 and ground, or a combination of an actual capacitor and inherent input capacitance. However, if a capacitor element is used, the inherent input capacitance of tube 17 and lead capacitances must be included in computing circuit parameters. The plate of tube 11 is coupled to the grid 20 of tube 17 through resistance 23 and a large blocking capacitor 60 which can be considered equivalent to an A. C. short in determining circuit operation. It is to be noted that the source of plate potential B+ is by-passed to ground, though not herein shown as such, for A. C. potentials. It can be seen, by comparing Fig. 3 with Fig. 1, that resistance 16 and inductance 15, comprise the first branch R—L of the constant resistance network shown in Fig. 1. The resistance 23 and capacitance 22 shown in Fig. 3 constitute the second branch, R—C, of the constant resistance network shown in Fig. 1. Since the plate supply B+ is by-passed to ground, for A. C. potentials, it is obvious that the ground side of capacitor 22 is effectively coupled to the B+ terminals of resistance 16, for all A. C. signals. In other words, both branches are returned to a common point, for all A. C. signals. This makes the plate load impedance of tube 11, that is, its equivalent A. C. plate load impedance, identical to the constant resistance network shown in Fig. 1.

The signals impressed upon grid 14 may be fed to a second stage through output terminal 24, which is shown connected directly to the plate 12 of tube 11. Since the equivalent plate load impedance of tube 11 is equivalent to a constant resistance, it is obvious that linear amplification in tube 11 is not affected by the input capacitance of tube 17. In other words, the output circuit of tube 11 is completely "unaware" of the input capacitance 22 of tube 17. Therefore, it can be seen that I have added a signal utilzation device to the output circuit of an amplifier without allowing the input capacitance of the signal utilization device to impair the amplification characteristics of the amplifier.

Figure 4:
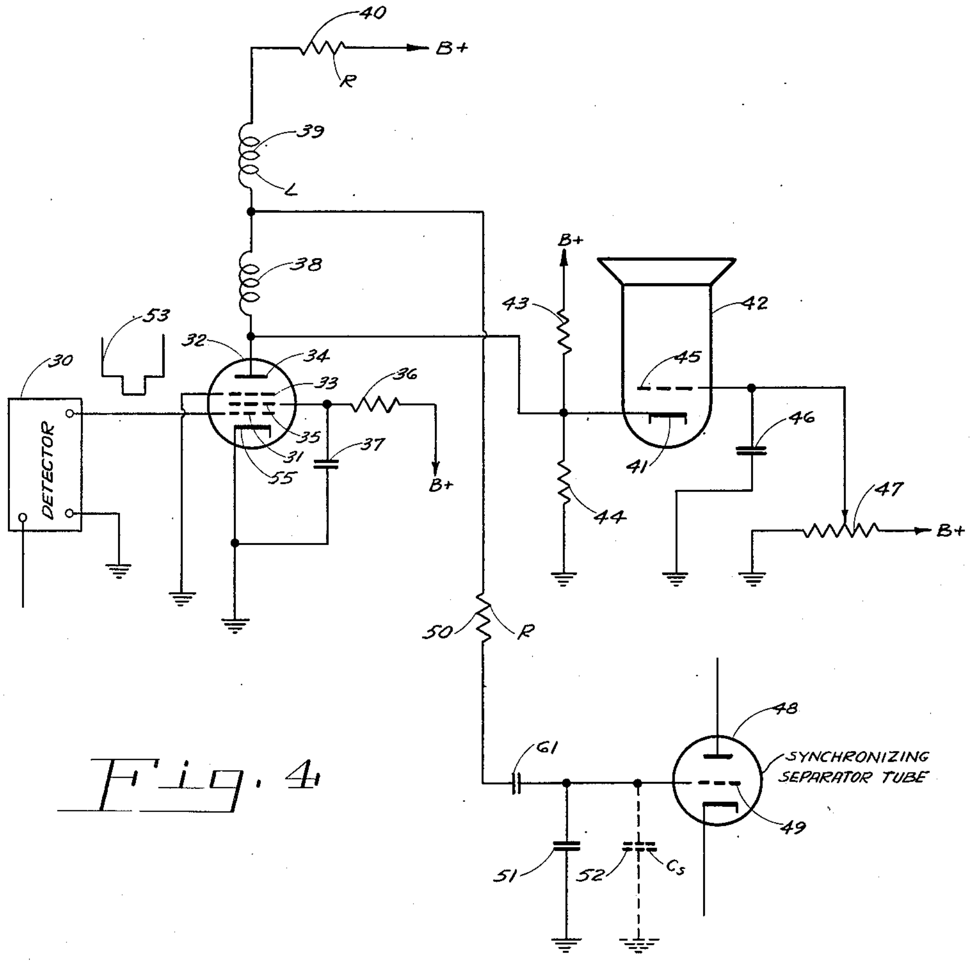
Fig. 4 shows a compensated video amplifier circuit embodying the present invention.

Fig. 4 illustrates the preferred embodiment of my invention, as used, with a high frequency shunt compensated video amplifier, in extracting synchronizing signals to be fed to a synchronizing separator circuit. Detector 30, which may be any conventional detector used in a television receiver system, is coulpled to control grid 31 of tube 32. Suppressor grid 33 is conventionally directly connected to ground. Screen grid 35 is connected through resistance 36 to a conventional source of screen grid potential B+ and the screen grid 35 is also by-passed to ground through by-pass condenser 37. Anode 34 is connected to a source of B+ plate potential through compensating inductance 38 and one branch of a constant resistance network, comprising inductance 39 and resistance 40. The cathode 41 of cathode ray picture tube 42 is shown connected to a bias source comprising resistances 43 and 44, which are connected to form a potential divider between B+ and ground. In this particular embodiment, the cathode of the cathode ray picture tube is used as an input electrode and the cathode 41 is therefore directly coupled to the anode 34 of tube 32. Grid 45 of cathode ray picture tube 42 is by-passed to ground through by-pass condenser 46 and is also connected to a source of bias potential, which comprises potentiometer 47 and a source of potential B+.

The circuit disclosed operates as a shunt compensated video amplifier, having all the desirable characteristics of optimum compensation for a high frequency signal even though the input capacitance of sync separator tube 48 is coupled into the equivalent A. C. plate circuit of tube 32. Control grid 49 of sync separator tube 48 is coupled through resistance 50 and a large blocking capacitance 61 to the high potential side of compensating coil 38 in the plate circuit of tube 32. The capacitance 51 connected between grid 49 of tube 48 and ground is shown by way of example only. The inherent input capacitance of tube 48 and coupling lead stray capacitance shown in dotted form as capacitor 52 may be of sufficient capacitive value to complete the constant resistance network if suitable parameters for the remainder of the network are correctly chosen. However, it may be desired, in some installations, to also include a capacitance element 51 to enlarge the normal output capacitance effect of tube 48, for reasons hereinafter to be discussed in the explanation of circuit operation.

As is mentioned above, the circuit operates basically as a shunt compensated video amplifier, and the video signal, whose polarity is indicated by sync signal 53 of Fig. 4 showing "black" and synchronizing tips to be negative, is amplified by tube 32 and impressed in the positive sense on the cathode 41 of cathode ray tube 42. Since the grid 45 of cathode ray tube 42 is connected through a bias source and by-pass condenser 46 to ground, this method of signal injection is the equivalent of feeding a signal in the negative sense to grid 45 of the cathode ray tube.

Figure 5:
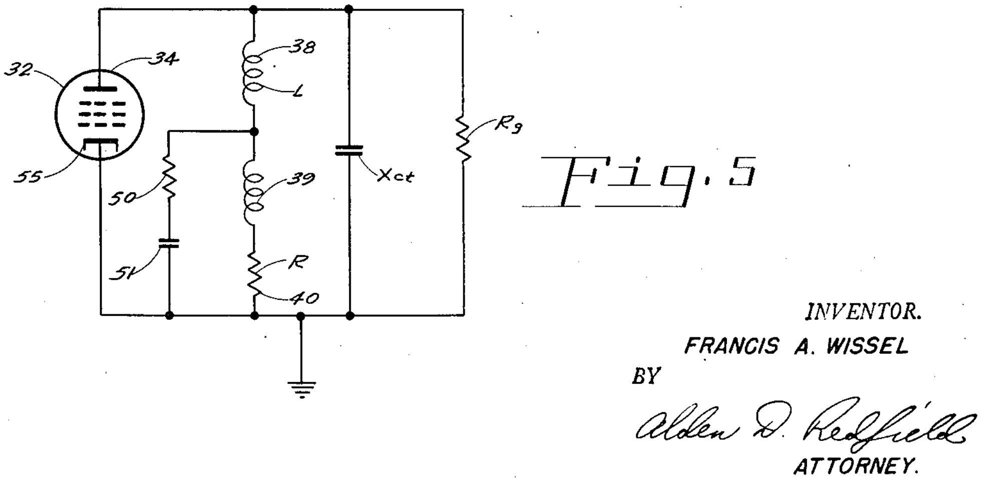
Fig. 5 shows an equivalent circuit of the amplifier portion of Fig. 4 for moderate and high frequencies.

The inherent input capacitance between cathode 41 of the cathode ray picture tube and ground, has a high impedance to low frequency signals and a low impedance to high frequency signals. For this reason, compensation is required to maintain a flat frequency response characteristic over the 4.5 megacycle-wide signal band. The shunt peaking method of high frequency compensating video amplifiers, which is used in the circuit of Fig. 4, is well known to those skilled in the art, and an exhaustive explanation is not deemed necessary herein. However, briefly, for purposes of explanation, reference is made to Fig. 5, which is an equivalent circuit diagram of amplifier tube 32, shown in Fig. 4, at moderate and high frequencies. Since the plate supply source B+ is by-passed to ground for A. C. signals, the cathode 55 of tube 32 is effectively connected to the B+ side of resistance 40. Also the ground side of capacitor 51 is connected to cathode 55. The inherent input capacitance of the cathode ray picture tube 42 is shown in Fig. 5 as $X_{ct}$, $R_g$ being the equivalent cathode resistance, which includes resistances 43 and 44 in parallel and the cathode impedance of the tube. When the low frequency portion of the signal band is impressed on the grid of tube 32, compensating inductance 38 has very little reactive effect and $X_{ct}$ has a very high reactance. Therefore, at the low frequency end of the signal band, the main element in the plate circuit of tube 32 which causes a plate drop is the constant resistance network which is effectively in parallel with $X_{ct}$ and also effectively connected between the anode 34 and the cathode 55. As the signal frequency fed to the input circuit of tube 32 increases, the reactance of the compensating inductance L increases and the reactance of input capacitance $X_{ct}$ decreases. By properly selecting the parameters of the constant resistance network and the compensating inductance L, the plate load impedance of tube 32 can be kept relatively constant over the complete frequency range of the video signal band. These parameters should be so chosen that the compensating coil L, which is also conventionally referred to as a peaking coil, resonates with $X_{ct}$ to form a parallel resonant circuit broadly tuned to the high frequency end of the video signal band. This resonant circuit is broadly tuned with a fairly low Q because of the damping effect of the constant resistance network in series with the inductance L in the tuned circuit. If the peaking coil, or compensating coils, is too large, the Q of the compensated circuit is too high and the response characteristic of the amplifier will rise near the high end of the video signal band. If the coil is too small, the plate impedance of tube 32 will not increase enough to maintain a flat response characteristic because of the low Q and response tends to drop off at the high end of the video signal band. After the correct parameters of R and L are selected for properly compensating the output of video amplifier 32, the parameters for the constant resistance network are selected. The two resistance elements R, R have a resistive magnitude equal to the resistance required for use in conjunction with the selected peaking coil L. The added elements, 51—52 and 39 are selected in accordance with Equation 1. It can now be seen that I have supplied means for coupling a sync separator tube 48 to the video amplifier 32 output circuit, whereby the video amplifier is completely "unaware" of the added input capacitance of tube 48.

The input capacitance of the sync separator may be enlarged by adding capacitance between grid 49 and ground to aid resistance 50 in the very important function of filtering out high frequency information fed to the grid of the sync separator tube. Resistance 50 also eliminates noise components when the sync separator circuit is of the type disclosed in the above mentioned Wissel et al, application. In the Wissel et al, circuit the sync separator tube grid-cathode path functions as a diode and a resistance similar to resistance 50 acts to clip noise components.

The average sync separator circuit operates satisfactorily if the voltage information fed to the input terminal consists of only relatively low frequency information, that is, information frequencies less than one-half megacycle. Since these circuits operate satisfactorily with a relatively low frequency input signal, there is a decided advantage in filtering out and clipping out the unnecessary high frequency components thereby also eliminating some of the noise frequency components. This is desirable in that noise components fed into the sync separator circuit often interfere with the synchronization of the horizontal oscillator circuit and indirectly cause other harmful effects to the quality of picture reproduction. Therefore, by using my novel coupling circuit combination, it is possible to couple a sync separator circuit to the output of the last stage of video amplification without interfering with the flat frequency responses of the video amplifier, and to also aid in filtering out and clipping out noise components which otherwise might be fed into the sync separator circuit, or signal utilization device.

As is explained above, my novel coupling means makes it possible to couple a sync separator circuit to a compensated video amplifier without compromising the compensation characteristic. Because of this, another major advantage is realized, in that it is usually possible to increase the value of the effective load resistance, thereby allowing a higher maximum amplification to be realized in the video amplifier output stage along with a higher maximum output for any given amplifier tube which might be used.

Thus it will be seen that I have provided a circuit combination comprising a video amplifier 32 having an input circuit and an output circuit, a signal utilization device 48 having an inherent input capacitive reactance 52, an inductor 38 and a second reactance 39—40, of different character from said input capacitive reactance 52, connected to the output circuit of said video amplifier, said inductor 38 having such a value as to form one element in a high frequency compensating network wherein the other parameter in said compensating network is a resistance R, and resistive means 50 coupling the input circuit of said utilization device 48 to said second reactance 39—40, said resistive coupling means 50 having such value as to coact with the second reactance 39—40 and the input capacitive reactance 52 of said signal utilization device to form a frequency independent network having a resistance equal to said R, thereby high frequency compensating said video amplifier in a manner relatively independent of said input reactance, and whereby the high frequency portions of the signal fed to the signal utilization device are attenuated.

While I do not desire to be limited to any specific circuit parameters, such parameters varying in accordance with individual circuit requirements, the following circuit values have been found entirely satisfactory in one successful embodiment of the invention, in accordance with Fig. 4.

| | |
|---|---|
| Resistance **36** | 4700 ohms |
| Resistances **40, 50** | 6800 ohms |
| Resistance **43** | 82,000 ohms |
| Resistance **44** | 150,000 ohms |
| Capacitance **37** | 11 microfarads |
| Tube **32** | 6AG5 |
| Tube **42** | 12LP4 |
| Tube **48** | 6AU6 |

While there has been shown and described what is at present considered the preferred embodiment of the present invention, it will be obvious to those skilled in the art that various changes and modifications may be made therein without departing from the appended claims.

Having thus described my invention, I claim:

1. In a television receiver the combination comprising a video amplifier having a control grid-cathode input circuit and an anode output circuit, said output circuit comprising a high-frequency peaking network having an inductor element coupled between said anode and one terminal of a two-terminal constant resistance network, the other terminal of said constant resistance network being A.-C. coupled to an equipotential plane, said constant resistance network comprising a sync separator tube input having an inherent capacitance C relative to said equipotential plane, a resistor having a resistance value R coupled between said one terminal and said sync separator tube input, a second inductor having an inductance value equal to $CR^2$, a second resistor having a resistance value R, said second inductor and said second resistor being series connected between said one terminal of the constant resistance network and the positive side of a source of A.-C. by-passed anode potential having its negative side connected to said equipotential plane, whereby said constant resistance network functions as the video load resistor.

2. In a television receiver circuit the combination comprising a kinescope input circuit, a high-frequency compensated video amplifier coupled to said kinescope input circuit, said amplifier having a control grid, an anode and a cathode, an A.-C. by-passed source of anode potential having a negative terminal connected to an equipotential plane, a high-frequency compensating circuit coupled between said anode and the positive terminal of said potential source, said compensating circuit comprising an inductor element and a two-terminal constant resistance network R connected in series wherein the inductance element is coupled to said anode and the resistance network is coupled to the positive terminal of said potential source, said constant resistance network comprising a sync pulse separator having an inherent input capacitance C relative to said equipotential plane, a resistance having a resistance parameter R coupled between said sync separator input and the constant resistance network terminal common to said compensating inductor, an inductor having an inductance parameter L and a resistor having a resistance parameter R connected in series between the two network terminals, the value of said inductor L being equal to $CR^2$, a source of composite video signals coupled to the input circuit of said amplifier, whereby the amplitude of the signals fed to the sync separator input are increasingly attenuated at higher frequencies and whereby the signals fed to said kinescope input are high frequency compensated.

FRANCIS A. WISSEL.

REFERENCES CITED

The following references are of record in the file of this patent:

UNITED STATES PATENTS

| Number | Name | Date |
|---|---|---|
| 2,085,409 | Bedford | June 29, 1937 |
| 2,149,331 | Blumlein | Mar. 7, 1939 |
| 2,289,666 | Maguire | July 14, 1942 |
| 2,356,141 | Applegarth | Aug. 22, 1944 |
| 2,370,399 | Goodale | Feb. 27, 1945 |
| 2,453,081 | Sziklai | Nov. 2, 1948 |
| 2,514,112 | Wright et al. | July 4, 1950 |
| 2,535,821 | Thomas | Dec. 26, 1950 |

FOREIGN PATENTS

| Number | Country | Date |
|---|---|---|
| 106,835 | Australia | Mar. 16, 1939 |
| 505,899 | Great Britain | May 15, 1939 |